United States Patent [19]

Dalton et al.

[11] Patent Number: 4,961,856

[45] Date of Patent: Oct. 9, 1990

[54] SOLVENT EXTRACTION PROCESS

[75] Inventors: Raymond F. Dalton, Cheadle Hulme; Arthur Burgess, Oldham, both of England

[73] Assignee: Imperial Chemical Industries PLC, London, England

[21] Appl. No.: 316,064

[22] Filed: Feb. 27, 1989

[30] Foreign Application Priority Data

Mar. 9, 1988 [GB] United Kingdom ............... 8805565
Dec. 14, 1988 [GB] United Kingdom ............... 8829121

[51] Int. Cl.$^5$ ..................... C02F 1/42; G21F 9/04
[52] U.S. Cl. ..................... 210/681; 423/22; 423/24
[58] Field of Search ............ 423/24, 22; 210/638, 210/727, 660, 663, 665, 666, 673, 677, 679, 681, 683–685

[56] References Cited

U.S. PATENT DOCUMENTS 4,654,145  3/1987  Penopoulos et al. ............... 423/24

*Primary Examiner*—Frank Sever
*Attorney, Agent, or Firm*—William E. Dickheiser

[57] ABSTRACT

An aqueous solution containing palladium is contacted with a solution of a heterocyclic ring compound having at least one ring substituent of the type —COX, which is, or contains, a hydrocarbyl group having at least 5 carbon atoms. The heterocyclic ring compound may be a pyridine mono-, di- or tri-carboxylic acid ester, for example the bis-isodecyl ester of pyridine- 3,5-dicarboxylic acid. Other heterocyclic ring compounds include those having a pyrimidine, pyrazine, pyridazine, 1,2,4-triazole or imidazole ring. Palladium is extracted into the water-immiscible solution while other metals, particularly platinum group metals, remain in the aqueous solution. The palladium can be stripped from the water-immiscible solution for example using a dilute aqueous solution of ammonia.

17 Claims, No Drawings

SOLVENT EXTRACTION PROCESS

The present invention relates to a solvent extraction process and, in particular, to such a process which is capable of extracting palladium, especially separating palladium from platinum.

The use of solvent extraction techniques to separate wanted metal values from other metals has been known for many years and such techniques are being practised commercially for the separation of certain metals such as copper. Solvent extraction processes have been proposed for the separation of platinum and palladium. One process developed by the National Institute for Metallurgy (NIM) is described in Proc. International Solvent Extraction Conference, 1977, at pages 24 to 31. In the NIM process, platinum and palladium are separated from other metals by extraction using an amine type extractant and are stripped from the extractant using hydrochloric acid. The palladium is then separated from the platinum by solvent extraction using alkyl sulphides, particularly di-n-hexyl sulphide, as the extractant. The palladium may then be stripped from the extractant using ammonia as the ligand. Whilst the extractant is indicated to have a high capacity for palladium, it is stated that the kinetics of extraction are quite slow and that a typical contact time for complete extraction will be between one and three hours. An alternative procedure is described in Extraction Metallurgy, 1981, pages 34 to 41. According to this alternative procedure, palladium is extracted using hydroxyoximes, particularly the beta-hydroxyoximes. However, the extraction rate is reported to be slow and equilibration times of greater than three hours are indicated to be needed. Stripping of the palladium into a strip solution is also slow. In commercial operation it is desirable that extraction occurs quickly and equilibration times of several hours are not desirable.

It is an object of the present invention to provide a solvent extraction process for the extraction of palladium. It is a further object of the invention to provide a solvent extraction process for the separation of palladium and platinum. It is a yet further object of the present invention to provide a solvent extraction process in which a useful separation can be achieved in a relatively short time.

According to the present invention there is provided a solvent extraction process for extracting palladium values from aqueous solutions of palladium salts containing halide or pseudo halide anion which comprises the steps of (1) contacting the aqueous solution containing palladium salts with a solution of an extractant in a water-immiscible organic solvent; (2) separating the aqueous solution from the solution of the extractant in the water-immiscible solvent into which palladium has been extracted; and (3) contacting the resultant organic phase with an aqueous strip solution whereby the palladium transfers into the aqueous strip solution characterised in that the aqueous solution of palladium salts containing halide or pseudo halide anion is contacted with a solution in a water-immiscible organic solvent of an extractant which is a substituted heterocyclic compound containing a single heterocyclic ring containing 1, 2 or 3 nitrogen ring atoms and one or more groups —COX which are linked directly to the heterocyclic ring or are linked to the heterocyclic ring through a group A wherein A is an optionally substituted methylene linking group, an optionally substituted vinylene linking group or an optionally substituted phenylene linking group;

X is a group —$OR^1$ or —$NR^2R^3$;

$R^1$ is a hydrocarbyl group or substituted hydrocarbyl group containing from 5 to 36 carbon atoms; and $R^2$ and $R^3$ which may be the same or different, are hydrogen or a hydrocarbyl group or a substituted hydrocarbyl group, and in each group —$NR^2R^3$, $R^2$ and $R^3$ together contain from 5 to 36 carbon atoms.

The aqueous solution of palladium salts may also include salts of other metals. The solution may be obtained from a palladium-containing catalyst and may include other metals also contained in the catalyst or which are contaminants of the catalyst. Alternatively, the aqueous solution may be a solution containing platinum group metal salts.

The term "platinum group metal" as used herein refers to those metals in Group VIII of the Periodic Table which are in the fifth and sixth periods. Thus, the platinum group metals are platinum, palladium, ruthenium, rhodium, osmium and iridium. Typically, ores containing platinum group metals also contain other Group VIII metals such as iron and nickel. The ore may also contain other metals for example metals of Group IB of the Periodic Table such as copper, silver and gold.

All references herein to the Periodic Table are to the Short Periodic Table as set out on the rear inside cover of "General and Inorganic Chemistry" by J. R. Partington, Second Edition, published in 1954 by MacMillan and Co. Ltd., London.

The term "pseudo halide" is used herein to mean those compounds which show a resemblance to the halogens in their reactions and in the properties of their compounds and include cyanogen, oxy-, thio- and seleno-cyanogen and the azide radical.

The substituted heterocyclic compound may be of the general type

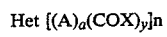

where A and X are as hereinbefore defined;

Het is, or contains, a single heterocyclic ring containing 1, 2 or 3 nitrogen ring atoms and the group or groups —$(A)_a(COX)_y$ are linked to the ring atoms of the heterocyclic ring;

a is 0 or 1;

n is at least one up to the maximum number of free valencies in the heterocyclic ring; and y is from 1 up to 3.

By the term "free valencies" is meant those valencies of the heterocyclic ring atoms which are not used in forming the ring.

Any free valencies which are not occupied by a group —$(A)_a(COX)_y$ are occupied either by a hydrogen atom or a substituent group (Y) which is selected from halogen, alkyl, aryl, alkoxy, aryloxy, aralkyl, alkaryl, cyano, nitro or carboxylic acid.

The group Het is a single heterocyclic ring which may be fused with a non-heterocyclic ring, for example a benzene ring as in a benzimidazole compound. In such a fused ring compound, the benzene ring may be unsubstituted, other than by the heterocyclic ring, or may be substituted by the groups Y, as hereinbefore defined.

In the substituted heterocyclic compound, if the hydrocarbyl groups $R^1$, $R^2$ and $R^3$ are substituted the substituents are one or more of halogen, for example chlorine, nitro, cyano, hydroxy, alkoxy, aryloxy, alkoxycarbonyl and alkylcarbonyloxy.

The group Het may be a pyridine, pyrimidine, pyrazine, pyridazine or 1,2,4-triazole ring or may be a fused ring system such as a benzimidazole system.

If the substituted heterocyclic compound is one containing at least two COX groups, the substituent —X in each of the respective groups —COX may be the same or different. Thus, for example, when n is two, the two groups —COX may be —COOR$^4$ and —COOR$^5$ respectively where R$^4$ and R$^5$ are different and are both hydrocarbyl groups containing from 5 to 36 carbon atoms. Similarly, if two groups —COX are present, the two groups —COX may be —COOR$^1$ and —CONR$^2$R$^3$ respectively.

If the substituted heterocyclic compound contains a group A, this is preferably a vinylene linking group which contains no substituents other than the groups —COX, and is particularly a vinylene linking group which contains two groups —COX, one on each carbon atom of the vinylene linking group.

In the substituted heterocyclic compounds which can be used in the process of the present invention, when the group X is OR$^1$, the group R$^1$ may be an alkyl group or a substituted alkyl group and is preferably an alkyl group, particularly an alkyl group containing from 8 to 24 carbon atoms such as, for example an octyl, nonyl, decyl, dodecyl, tridecyl, tetradecyl, pentadecyl, hexadecyl or octadecyl group.

Alternatively, and generally less preferably, the group R$^1$ may be a cycloalkyl group such as cyclohexyl; or an aralkyl group such as benzyl; or an aryl or alkylaryl group such as phenyl, p-nonylphenyl or p-dodecylphenyl.

If the substituted heterocyclic compound is one in which a single group —COX is linked directly to the heterocyclic ring and no substituent groups Y are present, the group R$^1$ is preferably a branched chain alkyl group containing from 9 to 24 carbon atoms. The group R$^1$ may be an isomeric mixture of groups containing the same number of carbon atoms or a mixture of groups containing different numbers of carbon atoms (which may themselves be an isomeric mixture), for example a mixture of different alkyl groups. If R$^1$ is a mixture of groups containing different numbers of carbon atoms, the average number of carbon atoms is preferably from 9 to 24.

Very conveniently the group R$^1$ may be a highly branched group such as is obtained by the reaction of the corresponding heterocyclic carboxylic acid with an alcohol prepared by the Guerbet and Aldol condensations. Such alcohols are characterised by branching at the position beta to the hydroxyl group, and have the general formula:

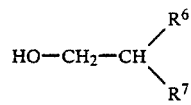

where R$^6$ and R$^7$ are alkyl groups and may be the same or different. In general R$^6$ contains 2 fewer carbon atoms than R$^7$, and groups R$^1$ derived from these alcohols include for example,

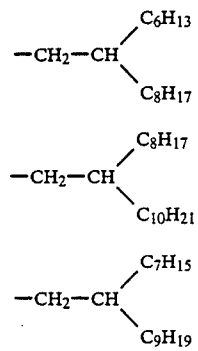

The groups R$^6$ and R$^7$ may be straight chain or branched chain alkyl groups and may be isomeric mixtures of alkyl groups. A mixture of highly branched alcohols may be obtained by Guerbet or Aldol condensations of mixtures of alcohols and aldehydes respectively.

An ester, especially a monoester, having a useful solubility in the water-immiscible organic solvent is obtained from an alcohol which is the product of the dimerisation of commercial nonanol (3,5,5-trimethylhexanol). In such an ester the group R$^1$ is believed to consist essentially of a mixture of geometrical isomers of a radical of the formula:

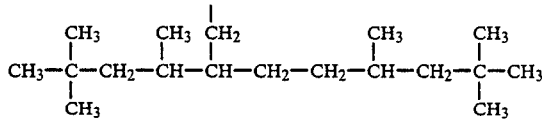

If the substituted heterocyclic compound is a diester, each group R$^1$ may be any of those groups R$^1$ listed previously. In the diesters, the groups R$^1$ are conveniently the same and are preferably straight chain or branched chain alkyl groups. When the substituted heterocyclic compound is a diester, we have obtained useful results when the groups R$^1$ together contain a total of from 16 to 36 carbon atoms. The groups R$^1$ may contain a mixture of isomers, for example a mixture of nonyl isomers derived from isononanol obtained by the hydroformylation of a mixture of octenes, a mixture of decyl isomers obtained from isodecanol, or a mixture of tridecyl isomers obtained from tridecanol.

If the substituted heterocyclic compounds used in the Process of the present invention are amides, that is the group X is the group —NR$^2$R$^3$, the group —NR$^2$R$^3$ may be a secondary (R$^2$ is hydrogen) or a tertiary group. The groups R$^2$ and R$^3$, which may be the same or different, may be groups of the type indicated previously for the group R$^1$. In each group —NR$^2$R$^3$, R$^2$ and R$^3$ taken together contain from 5 to 36 carbon atoms. Thus R$^2$ may be, for example, a lower alkyl group, for example a methyl group, provided R$^3$ is correspondingly larger. It is particularly preferred that R$^2$ and R$^3$ taken together are alkyl groups containing a total of 15 to 36 carbon atoms. If the group —NR$^2$R$^3$ is a tertiary group, sufficient solubility in preferred water-immiscible organic solvents may generally be achieved if R$^2$ and R$^3$ are straight chain or branched chain alkyl groups. However if —NR$^2$R$^3$ is a secondary group (R$^2$ is hydrogen), R$^3$ is preferably a branched chain alkyl group. When n is two, and all of the groups R$^2$ and R$^3$ are alkyl groups, the total number of alkyl carbon atoms preferably does not exceed 70, for example the total number of alkyl carbon atoms is preferably from 20 to 70.

As a more specific aspect of the present invention there is provided a solvent extraction process for extracting palladium values from aqueous solutions of palladium salts containing halide or pseudo halide anion which comprises the steps (1) to (3) described herein, characterised in that the aqueous solution of palladium salts containing halide or pseudo halide anion is contacted with a solution in a water-immiscible organic solvent of an extractant which is a substituted pyridine of formula:

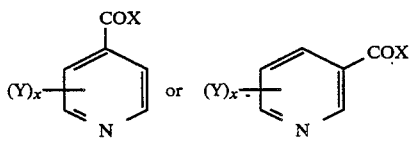

where X and Y are both as hereinbefore defined; and
x is zero or an integer from 1 up to 4.

Preferably the substituted pyridine is one in which x is zero.

As a yet further aspect of the present invention there is provided a solvent extraction process for extracting palladium values from aqueous solutions of palladium salts containing halide or pseudo halide anion which comprises the steps (1) to (3) described herein characterised in that the aqueous solution of palladium salts containing halide or pseudo halide anion is contacted with a solution in a water-immiscible organic solvent of an extractant which is a substituted pyridine of formula:

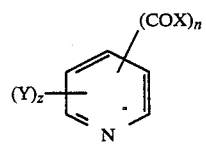

wherein
X is a group $-OR^1$ or $-NR^2R^3$;
n is 2 or 3;
each $R^1$ which may be the same or different, is an alkyl group and together the groups $R^1$ contain a total of from 16 to 36 carbon atoms;
each $R^2$ and $R^3$ which may be the same or different, is an alkyl group and the total number of alkyl carbon atoms contained in all the respective groups $R^2$ and $R^3$ is from 20 to 70;
z is zero or an integer from 1 up to (5-n); and
each Y which may be the same or different, is one or more of the substituents halogen, alkyl, aryl, alkoxy, aryloxy, aralkyl, cyano, nitro or carboxylic acid.

When z has a value of at least one, the pyridine ring carries substituent(s) in addition to the group(s) —COX. The substituent may be a carboxylic acid group, and the process of the present invention includes the use, for example, of a half ester of a pyridine dicarboxylic acid.

The substituted pyridine compounds which can be used in the process of the present invention are disclosed in European Patent Specification No. 0057797, which also discloses processes for the preparation of these substituted pyridine compounds and also the use of such compounds as extractants of copper values from an aqueous solution of a copper salt containing halide or pseudo halide. Substituted pyridine compounds which can be used in the process of the present invention can be prepared by the procedures described in more detail in European Patent Specification No. 0057797, the disclosure of which is incorporated herein by reference.

Substituted pyridine compounds which can be used in the process of the present invention include those in which the value of n is one and examples of such compounds include the esters and amides of nicotinic, isonicotinic and picolinic acids. Other compounds which can be used include those in which the value of n is two such as the bis esters or bis amides of the pyridine diacids including pyridine-2,4-dicarboxylic acid, pyridine-2,5-dicarboxylic acid and pyridine-3,5-dicarboxylic acid. When the value of n is three, the substituted pyridine compound may be a tris-ester or tris amide of a pyridine triacid such as pyridine-2,4,6-tricarboxylic acid. A mixture of compounds may be used such as a mixture of esters and amides or a mixture of bis-esters or bis-amides of isomeric pyridine-dicarboxylic acids. Alternatively, the substituted pyridine compound may be one derived from a di- or tri-carboxylic acid and containing both ester and amide groups.

According to a further aspect of the present invention, the substituted heterocyclic compound may be one in which the heterocyclic group is a ring containing two nitrogen atoms as in the pyrimidine, pyrazine and pyridazine derivatives of the following formulae:

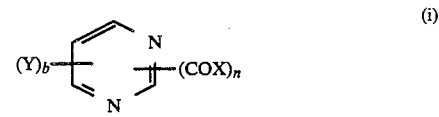 (i)

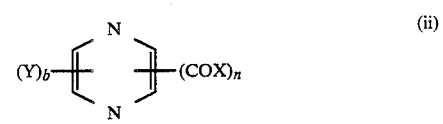 (ii)

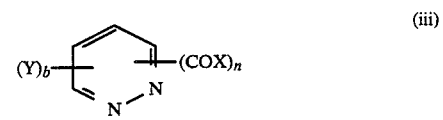 (iii)

wherein X and Y are as hereinbefore defined;
n is 1, 2 or 3; and
b is zero or an integer from 1 up to (4-n).

The 5 to 36 carbon atoms which are present in the groups $R^1$ or $R^2$ and $R^3$ are preferably alkyl carbon atoms. The group Y may be a substituent containing one or more alkyl carbon atoms, in which case the number of alkyl carbon atoms present in $R^1$ or $R^2$ and $R^3$ may be reduced accordingly provided $R^1$ or $R^2$ and $R^3$ contain at least 5 carbon atoms.

Preferably at least one position ortho to one of the two nitrogen atoms in the pyrimidine, pyrazine or pyridazine ring is free from bulky substituents and preferably is free from any substituent. It is especially preferred that both positions ortho to at least one of the nitrogen atoms are free from bulky substituents, and preferably are free from any substituent. There is thus a general preference that one of the two nitrogen atoms in the pyrimidine, pyrazine or pyridazine ring is sterically unhindered, whilst the other nitrogen atom is sterically hindered by one or more adjacent substituents.

As noted previously herein, when n is 2 or 3, the substituent —X in the respective groups —COX may be the same or different. As examples of suitable pyrazines wherein n is 2, there may be mentioned alkyl esters of 2,6-dicarboxypyrazine. As examples of suitable pyrimidines wherein n is 2, there may be mentioned alkyl esters of 4,5-dicarboxypyrimidine. As examples of suitable pyridazines wherein n is 2 there may be mentioned alkyl esters of 4,5-dicarboxypyridazine.

When n is 1, the group —COX is preferably located in the −5 position in the pyrimidine ring, since we have found that such compounds generally have superior hydrolytic stability. In the pyrazine ring the substituent —COX will be in a position adjacent to one of the nitrogen atoms.

The group, or groups, —Y if present are preferably one or more alkyl groups, for example one or more lower alkyl groups or are one or more optionally substituted aryl groups. As optionally substituted aryl groups there may be mentioned the phenyl group and the phenyl group carrying as optional substituent one or more lower alkyl groups or lower alkoxy groups or one or more halogen atoms or one or more carboxylic acid or carboxylic acid ester groups. The presence of, for example an alkyl substituent, on the aryl group may provide enhanced solubility of the reagent in the water-immiscible organic solvent or may permit the use of a relatively shorter alkyl chain in the group —$OR^1$.

Pyrimidine compounds which can be used in the process of the present invention and which have the group —COX in the preferred −5 position, preferably have a substituent —Y in the −4 (or the equivalent −6) position, thereby increasing the steric hindrance of the nitrogen in the −3 (or the equivalent −1) position.

Similarly, the substituted pyrazine compounds may have a substituent —Y in the −6 position to hinder the reactivity of the nitrogen in the −1 position, thereby favouring the formation of a metal complex through the nitrogen in the −4 position.

The substituted pyrimidine, pyrazine and pyridazine compounds which can be used in the process of the present invention are disclosed in European Patent Specification No. 0112617, which also discloses processes for the preparation of these substituted compounds and also the use of such compounds as extractants of copper values from an aqueous solution of a copper salt containing halide or pseudo halide. Substituted pyrimidine, pyrazine and pyridazine compounds which can be used in the process of the present invention can be prepared by the procedures described in more detail in European Patent Specification No. 0112617, the disclosure of which is incorporated herein by reference.

In the substituted pyrimidine, pyrazine and pyridazine compounds the group $R^1$ may be derived from a primary alcohol, which is preferably a branched chain primary alcohol but, for the pyrazine compounds especially, there may be advantages in employing a group $R^1$ derived from a branched secondary or tertiary alcohol, such as for example 3,9-diethyltridecan-6-ol.

As yet a further aspect of the present invention, the substituted heterocyclic compound may be one in which the heterocyclic group is a 1-substituted 1,2,4-triazole as in compounds of the formula:

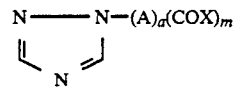

where
A, X, a and m are all as hereinbefore defined.

When a in the preceeding formula is 0, m will be 1 and the substituted triazole is a derivative of respective formulae:

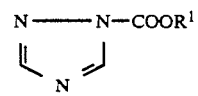

and

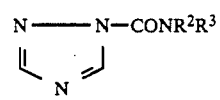

When a is 1 and A is a methylene group, the 1-substituted triazoles have the formula:

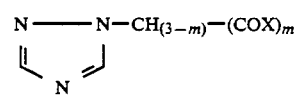

wherein m is from 1 to 3 and X is as hereinbefore defined, and wherein any hydrogen atoms not replaced by a —COX group may be replaced by an optical substituent such as a halogen atom, cyano group, nitro group or lower alkyl group. We have found that when m is 3, the compounds generally have reduced hydrolytic stability, and it is preferred that m is 1 or 2. When m is 2, the compound is found to show a good balance of properties as between hydrolytic stability and reagent "strength" as discussed below.

The term "lower alkyl group" as used herein indicates an alkyl group containing from 1 to 4 carbon atoms.

When a is 1 and A is an optionally substituted vinylene linking group, the triazole typically has the formula:

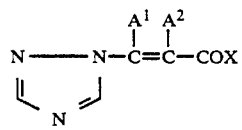

wherein X has the meaning given previously and $A^1$ and $A^2$ are hydrogen or optional substituents such as a halogen atom (for example a fluorine or chlorine atom), cyano group, nitro group or a lower alkyl group or the group —COX. A useful extractant of this type is one in which $A^1$ is a group —COX, $A^2$ is hydrogen and X is the same in both groups COX. Compounds of this type have good hydrolytic stability.

To achieve good solubility of the compound in preferred water-immiscible organic solvents, $R^1$, $R^2$ and $R^3$ respectively are preferably branched alkyl groups or a mixture (including an isomeric mixture) of branched alkyl groups. It has been found that certain branched chain groups also provide improved hydrolytic stability.

The 1-substituted-1,2,4-triazoles of the present invention may be prepared by conventional means. For example the (hydrocarb)oxycarbonyl derivatives wherein X is OR$^1$ and a is 0 may be prepared by the reaction of a hydrocarbyl chloroformate, derived from the corresponding hydrocarbyl alcohol, R$^1$OH, with 1,2,4-triazole. If a is 1, the compounds may be prepared by reaction with the alcohol R$^1$OH with the acid:

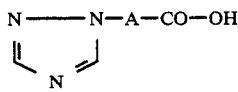

or with the acid hydride thereof.

It has been found that compounds having a high degree of branching at the positions in the vicinity of the carbonyl group generally show an improved resistance to hydrolysis under the stringent conditions employed in the solvent extraction process.

For example for 1-(hydrocarb)oxycarbonyl derivatives wherein X is —OR$^1$, a high degree of branching at the position in the vicinity of the carbonyl group may be obtained for example by using a secondary alcohol as starting material. Suitable secondary alcohols may be prepared for example by the procedures described by Pearce, Richards and Scilly in J. Chem. Soc. (Perkin I), 1972 pp. 1655 to 1669. We have found for example that a product prepared from such a secondary alcohol has a higher hydrolytic stability than a product obtained from a primary alcohol.

1-substituted-1,2,4-triazoles which can be used in the process of the present invention are disclosed in UK Patent Specification No. 2150133, which also discloses processes for the preparation of these substituted compounds and also the use of such compounds as extractants of copper values from an aqueous solution of a copper salt containing halide or pseudo halide. 1-substituted-1,2,4-triazole compounds which can be used in the process of the present invention can be prepared by the procedures described in more detail in UK Patent Specification No. 2150133, the disclosure of which is incorporated herein by reference.

As a yet further aspect of the present invention, the substituted heterocyclic compound may be one in which the heterocyclic group is, or contains, a diazole ring as in a N-substituted 1,3-diazole compound of formula:

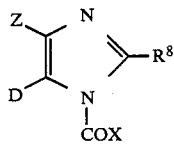

wherein X is as hereinbefore defined;
R$^8$ is hydrogen or an optionally substituted lower alkyl group or an optionally substituted vinyl group; and
D and Z, which may be the same or different, are separately hydrogen, an optionally substituted hydrocarbon group, a halogen, a nitro group, a cyano group or a carboxylic ester group, or where D and Z both together with the two carbon atoms joining them form an optionally substituted aromatic or aliphatic cyclic group.

As diazole compounds which may be used in the present invention there may be mentioned benzimidazoles of formula:

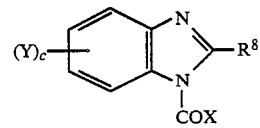

imidazoles of formula;

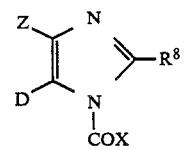

and tetrahydrobenzimidazoles of formula:

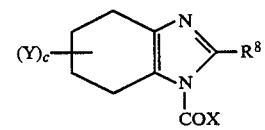

wherein
D, R$^8$, X, Y and Z are all as hereinbefore defined; and
c is zero or from 1 up to 3.

In the tetrahydrobenzimidazole, it is preferred that Y, if present, is a hydrocarbyl group. The number of substituents Y is preferably zero, one or two.

R$^8$ is preferably hydrogen, as it has been found that such compounds generally have a suitable strength of ligand and a better selectivity for metal over acid (as will be discussed later).

It is preferred that the total number of alkyl carbon atoms in all substituents of the diazole compound is from 9 to 30 and preferably from 14 to 30, since the solubility of the compound in suitable water-immiscible organic solvents may be undesirably low if the total number of saturated carbon atoms is less than 14, whilst the disengagement of the organic and aqueous phases during the solvent extraction may be undesirably slow if the total number of alkyl carbon atoms exceeds 30.

In the group —COOR$^1$, the group R$^1$ is preferably an alkyl group, but may alternatively be a cycloalkyl group such as cyclohexyl, an aryl, an alkylaryl or an alkoxyaryl group.

To achieve good solubility of the compound in preferred water-immiscible organic solvents, R$^1$ is preferably a branched alkyl group or a mixture (including an isomeric mixture) of branched alkyl groups. If R$^1$ is an aralkyl or alkoxyaryl group, the alkyl portion of the group is preferably a branched alkyl group or a mixture (including an isomeric mixture) of branched alkyl groups. The hydrocarbyl group R$^1$ in the heterocyclic compound is preferably an alkyl group and the preferred number of alkyl carbon atoms in the group R$^1$ depends on the total number of alkyl carbon atoms in the other substituents of the diazole compound. If R$^8$ is hydrogen or methyl and the substituted heterocyclic compound is a benzimidazole compound whose substituent(s) Y together contain either no alkyl carbon atoms or at most one alkyl carbon atom, or there is used an imidazole whose substituents D and Z together contain either no alkyl carbon atoms or at most one alkyl carbon atom, or there is used a tetrahydrobenzimidazole whose substituent(s) Y together contain either no alkyl carbon atoms or at most one alkyl carbon atom, then in each case it is preferred that $R^1$ contains from 9 to 24 carbon atoms.

Compounds for use in the process of the present invention wherein —COX is the group —$CO.OR^1$ may be prepared for example from the alcohol $R^1OH$ by treatment with phosgene to give the chloroformate compound $R^1O$—CO.Cl which may be reacted with the appropriate imidazole, benzimidazole or tetrahydrobenzimidazole to give the desired product.

Good solubility in preferred water-immiscible organic solvents is conferred on the substituted diazole compounds when $R^1$ is derived from commercial isooctadecanol prepared as previously described herein.

It has been found that compounds having a high degree of branching, and especially compounds having a high degree of branching at the position adjacent to the carbonyl function in the group —$COOR^1$ show an improved resistance to hydrolysis under the stringent conditions employed in the solvent extraction process.

As noted previously herein the group —$CO.OR^1$ may be prepared by the reaction of the alcohol and phosgene to form the chloroformate which is reacted with a diazole compound. In this reaction, the use of a primary alcohol such as isooctadecanol having a high degree of branching at the carbon atom adjacent to the —$CH_2OH$ group gives rise to a product in which the highly branched group is separated from the carbonyl function by the —$CH_2$— group. Such products have superior hydrolytic stability as compared with the corresponding unbranched compound but further improvements in hydrolytic stability may generally be obtained by using a secondary alcohol $R^1OH$, for example 3,9-diethyltridecan-6-ol as starting material. Such a secondary alcohol provides the branching in a position directly adjacent to the carbonyl function.

The diazoles for use in the present invention wherein —COX is the group —$CO.NR^2R^3$ may be prepared by conventional means, for example by treatment of the appropriate benzimidazole, imidazole or tetrahydrobenzimidazole with an alkyl isocyanate in the presence of a catalyst such as dibutyltin dilaurate.

N-substituted-1,3-diazoles which can be used in the process of the present invention are disclosed in European Patent Specification No. 0193307, which also discloses processes for the preparation of these substituted compounds and also the use of such compounds as extractants of metal values, particularly copper and zinc, from an aqueous solution of a metal salt containing halide or pseudo halide. N-substituted-1,3-diazole compounds which can be used in the process of the present invention can be prepared by the procedures described in more detail in European Patent Specification No. 0193307, the disclosure of which is incorporated herein by reference.

The process of the present invention can be used for the solvent extraction of palladium from aqueous solutions containing halide or pseudo halide anions in the presence of a range of other metals.

The aqueous solution may contain palladium values extracted from a palladium-containing catalyst and may also contain any other metals present in the catalyst, either as components or contaminants, and which are extracted with the palladium.

Alternatively, the aqueous solutions which can be used in the process of the present invention may be obtained by digesting, with aqua regia, an ore containing precious metals such as gold, silver and the platinum group metals, subsequently boiling off the nitric acid and adding ammonia to the residual solution. Some of the metal values are precipitated during this treatment and are filtered off before the solvent extraction process is effected. The ores containing platinum group metals are typically complex and contain varying proportions of a range of metals. The ore may be digested and subjected to few or many intermediate stages before being subjected to the solvent extraction process of the present invention. Hence, the aqueous solution which is used in the solvent extraction process may be one from which at least some of the metals present in the ore have already been separated. It is a particular aspect of the process of the present invention that it is effective in separating palladium from platinum. Hence, the aqueous solution which is treated in accordance with the present invention typically contains palladium and platinum and may contain other metals which may be platinum group metals or other constituents of the ore including copper and nickel.

We have found that the solvent extraction process of the present invention removes palladium from the aqueous phase into the organic phase containing the substituted heterocyclic compound but, with the exception of any copper which is present in the aqueous solution, only minor proportions of the other metals present in the aqueous solution are extracted. If copper is present in the aqueous solution, a substantial proportion of the copper is extracted into the organic phase together with the palladium. The organic phase is separated from the original aqueous solution and may then be selectively stripped to recover copper and palladium, essentially free of the other metal.

Thus, according to a particular aspect of the present invention the aqueous solution contains platinum group metals and copper and is subjected to stages (1) and (2) wherein stage (3) is effected in two steps, and in the first step (a) the organic phase is contacted with water or a dilute aqueous acid and in the second step (b) the residual organic phase is contacted with an aqueous ammonia solution.

In step (3b), the residual organic solution is contacted with an aqueous ammonia solution which is typically a solution having an ammonia content of 2 to 20% w/v, especially 5 to 15% w/v.

We have found that, in the foregoing process, in step (3a) copper is stripped from the organic phase into the aqueous phase to give an organic phase which is essentially free of copper and an aqueous phase which is essentially free of palladium. In step (3b), essentially all of the palladium is stripped from the organic phase, the residual levels of copper and palladium in the stripped organic phase being typically less than 5 and 50 ppm by weight respectively.

Hence, the process of the present invention can be used to extract and separate copper and palladium values from an aqueous solution containing platinum group metals and copper. The extracted and separated palladium and copper are present in aqueous solution from which the palladium, and the copper if desired, can be recovered using known techniques. More specifically, the aqueous solution from step (3a) may be electrolysed to recover copper. The aqueous solution from step (3b) may be treated to recover palladium, for example by the precipitation of an ammonia palladium chloride complex.

The aqueous solutions containing the platinium group metal salts contain palladium and platinum and typically contain at least one of copper, gold, rhodium, ruthenium, iridium, lead, nickel, iron and silver. The substituted heterocyclic compound is selective and extracts copper and palladium but the other metals are extracted only at levels of a few ppm by weight, that is less than 20 ppm by weight and typically not more than 10 ppm by weight. The levels of the metals present in the aqueous solution can vary in dependence on the composition of the original ore and also on any intermediate steps to which the solution has been subjected. Metals such as copper, palladium, nickel and iron are typically present in the solution at a concentration of at least 1 g/dm$^3$ of solution and may be present at concentrations in excess of 10 g/dm$^3$, for example up to about 100 g/dm$^3$ although such high concentrations are typically achieved only with copper. Other metals such as rhodium and lead may be present at a concentration of at least 100 mg/dm$^3$ up to about 5 g/dm$^3$. Ruthenium may be present at a concentration of from about 20 mg/dm$^3$ up to about 600 mg/dm$^3$. Other metals which may be present include platinum, gold, iridium and silver and these are typically present at concentrations between 10 mg/dm$^3$ and 100 mg/dm$^3$.

The aqueous solution typically contains halogen or pseudo halogen anions and preferably contains chloride ions. The halogen or pseudo halogen concentration is typically at least 1 M and may be as high as 10 M. The aqueous solution may also contain acid and is typically between 0.01 and 1 M in acid, particularly hydrochloric acid.

It will be appreciated that many of the metals which are present in the original aqueous solution can exist in more than one valency state. The effectiveness of the solvent extraction process is dependent on the valency states of the various metals present in the aqueous solution. If conditions are adjusted such that any copper present exists essentially all in the divalent state, as a cupric salt, the solvent extraction process results in extraction of copper and palladium with only very low levels of the other metals being extracted.

The process of the present invention is believed to proceed by the formation of a complex, for example a halogeno complex, between the palladium, or copper, salt and the substituted heterocyclic compound (the extractant), this complex being soluble in the organic phase. The formation of this neutral complex is believed to be reversible and, during the stripping stage or stages, the complex breaks down and the metal salt passes into the aqueous phase whilst the extractant remains in the organic phase which can then be recycled to the solvent extraction stage.

At the stripping stage, the organic phase containing the extractant and the extracted metals is contacted with an aqueous phase which may be water or a solution having a reduced metal or halogen or pseudo halogen, concentration whereby the metal is transferred into the aqueous phase.

In the stripping stage, stripping to remove copper is effected using water or a dilute acid as the stripping medium from which any copper which is present may be recovered by electrolysis. However, it will be appreciated that the recovery of copper in such a system may not be viable commercially and hence, once the copper has been separated from the palladium, it may be discarded.

The aqueous solution contains high levels of several metals including iron and it is important that the extractant should have good selectivity for palladium and copper over the other metals including iron. The extractants used in the process of the present invention have this property.

A yet further property which is of importance in the process of the present invention is the absence of significant protonation by the aqueous solution containing the platinum group metals. Protonation of the extractant not only carries acid into the organic phase, building up unnecessary halide or pseudo halide concentration on the strip side, but is also believed to be associated with loss of selectivity for palladium and copper over other metals present in the aqueous solution, for example silver. Again the preferred extractants of the present invention have excellent resistance to protonation even in contact with relatively acidic leach solutions.

The process of the present invention can be effected using a wide range of substituted heterocyclic compounds as the extractant. We have obtained good extraction of palladium, together with copper, from aqueous solutions containing platinum group metals together with other metals when using, as the extractant, the bis esters of pyridine-3,5-dicarboxylic acid, for example the bis-isodecyl ester; or other extractants such as an ester of pyrazine-2-carboxylic acid, for example the mixed branched octadecyl ester; an ester of 4-phenylpyrimidine-5-carboxylic acid, for example the mixed branched octadecyl ester; an ester of 1,2,4-triazole-1-carboxylic acid, for example the 2-octyldodecyl ester and an ester of benzimidazole-1-carboxylic acid, for example the mixed branched octadecyl ester.

Particularly useful results are obtained when the substituted heterocyclic compound is a substituted pyridine compound and it is a particular aspect of the present invention to use, as the substituted heterocyclic compound, a bis ester of pyridine-3,5-dicarboxylic acid.

The process of the present invention is effected by contacting an aqueous solution with a solution of the extractant in a water-immiscible organic solvent. Examples of suitable water-immiscible organic solvents are aliphatic, aromatic and alicyclic hydrocarbons, chlorinated hydrocarbons such as perchloroethylene, trichloroethane and trichloroethylene. Mixtures of solvents may be used. Especially preferred in conventional hydrometallurgical practice are mixed hydrocarbon solvents such as high boiling, high flash point, petroleum fractions (for example kerosene) with varying aromatic content. In general, hydrocarbon solvents having a high aromatic content, for example AROMASOL H which consists essentially of a mixture of trimethylbenzenes and is commercially available from Imperial Chemical Industries PLC (AROMASOL is a registered trade mark), provide a higher solubility for the extractant and the metal complexes formed, whilst kerosene having a relatively low aromatic content, for example ESCAID 100 which is a petroleum distillate containing 20% aromatics, and which is commercially available from ESSO (ESCAID is a registered trade mark) may in certain cases improve the hydrometallurgical performance of the extractant. Factors influencing the solubility of the extractant and its metal complexes are complicated, but in general extractants having highly branched substituents and/or an isomeric mixture of substituents have comparatively high solubility.

metals therein. The results obtained are set out in Table One.

TABLE ONE

| Phase | Metal and concentration (mg/dm$^3$) | | | | | | | | | | |
|---|---|---|---|---|---|---|---|---|---|---|---|
| (a) | Cu | Pd | Pt | Au | Rh | Ru | Ir | Pb | Ni | Fe | Ag |
| Orig.Aq | 7635 | 6920 | 90 | 20 | 335 | 400 | 22 | 965 | 4900 | 6065 | 40 |
| Ext.Aq. | 3990 | 885 | ND | ND | ND | ND | ND | ND | ND | ND | ND |
| Ext.Org. | 4061 | 6315 | 2 | 4.5 | <1 | <2 | <10 | 6 | 5 | 2 | <1 |

Notes to Table One
ND means Not Determined.
(a) Orig.Aq. means original aqueous phase.
Ext.Aq. means the aqueous phase after being contacted with the organic phase.
Ext.Org. means the organic phase after being contacted with the aqueous phase.

The concentration of the extractant in the water-immiscible organic solvent may be chosen to suit the particular aqueous solution to be treated. Typical values of extractant concentration in the organic phase are between about 0.1 to 2 Molar, and an especially convenient range is from 0.2 to 0.8 Molar in the organic solvent.

The extraction stage and the strip stage of the solvent extraction process may conveniently take place at ambient temperature for example in the range 20° to 30° C. However it is possible to improve the metal transfer from the aqueous solution to the strip solution if the extraction stage is operated at ambient temperature, whilst the strip stage is operated at elevated tempera- The aqueous phase after extraction (Ext.Aq.) was analysed only for copper and palladium since the analysis of the organic extract (Ext.Org.) indicated that very little of the other metals had been extracted into the organic phase.

EXAMPLE 2

The procedure of Example 1 was repeated with the exception that a different aqueous solution was used which contained different concentrations of the various metals with a total chloride concentration of 199 g/dm$^3$, corresponding to 5.6 M in chloride ions, and having a pH of −0.22. The results obtained are set out in Table Two.

TABLE TWO

| Phase | Metal and concentration (mg/dm$^3$) | | | | | | | | | | |
|---|---|---|---|---|---|---|---|---|---|---|---|
| (a) | Cu | Pd | Pt | Au | Rh | Ru | Ir | Pb | Ni | Fe | Ag |
| Orig.Aq | 73500 | 28000 | 44 | 12 | 1015 | 55 | <20 | 3830 | 15500 | 1570 | 95 |
| Ext.Aq. | 62590 | 19270 | ND | ND | ND | ND | ND | ND | ND | ND | ND |
| Ext.Org. | 9467 | 8040 | <1 | 2.5 | <1 | <2 | <10 | 8 | 8 | 11 | <1 |

Notes to Table Two
ND and (a) are both as defined in Notes to TABLE One.

ture, for example up to 70° C., especially up to 50° C. We have also found that the undesirable formation and build-up of oligomeric complexes of the extractant and the metal or metals may be alleviated if the strip stage is operated at elevated temperatures, for example up to 70° C.

The invention is illustrated by the following Examples in which all parts and percentages are by weight unless otherwise stated.

EXAMPLE 1

An organic solution of di-isodecylpyridine-3,5-dicarboxylate was prepared by dissolving the di-ester in ESCAID 100 (a petroleum distillate containing 20% aromatics) to give a concentration of 223 g/dm$^3$ of the di-ester in the solvent, which corresponds to a 0.5 Molar solution of the di-ester. The ester was prepared by the procedure described in Example 11 of European Patent Specification No. 57797.

The organic solution was used to extract palladium from an aqueous solution containing platinum group metals, and other metals, as their chlorides in a solution with a total chloride concentration of 111 g/dm$^3$, corresponding to 3.13 M in chloride ion and having a pH of 0.01.

The extraction was effected using 30 cm$^3$ of the organic solution and 30 cm$^3$ of the aqueous solution. The solutions were contacted by vigorous stirring at 25° C. for 30 minutes. The phases were then allowed to separate. The original aqueous phase, the final aqueous phase and the final organic phase ware analysed to determine the concentration of at least some of the

EXAMPLE 3

The process of this example demonstrates the selective stripping of copper and palladium from the organic solution of the extractant.

The procedure of Example 1 was repeated with the exception that 60 cm$^3$ of the organic solution was contacted with 60 cm$^3$ of the aqueous solution. After separation of the aqueous and organic phases, samples of each were filtered and the filtered solutions were analysed.

A 40 cm$^3$ portion of the organic phase was then contacted with a 40 cm$^3$ portion of water by shaking vigorously for two minutes at 25° C. The aqueous phase was separated and the organic phase was contacted with a further 40 cm$^3$ portion of water using the same procedure. The two aqueous phases were combined. Samples of both the organic and aqueous phases were analysed.

A 20 cm$^3$ portion of the water stripped organic phase was contacted with a 20 cm$^3$ portion of an aqueous ammonia solution having an ammonia content of 9% w/v. Contacting was effected by shaking vigorously at 25° C. for 2 minutes. The two phases were separated and the organic phase was contacted with a further 20 cm$^3$ of the same aqueous ammonia solution using the same procedure. The two ammonia solutions were combined. Samples of the aqueous and organic solutions were filtered and analysed.

The results of the analyses of the various fractions at different stages are set out in Table Three.

TABLE THREE

| Phase (a)(b) | Metal and Concentration (mg/dm³) | |
|---|---|---|
| | Cu | Pd |
| Orig.Aq. | 7635 | 6290 |
| Ext.Org. | 4035 | 5925 |
| Water Wash | 2033 | <1 |
| Washed Org. | 1 | 5995 |
| Ammonia | ND | 2815 |
| Res.Org. | ND | 26 |

Notes to Table Three
(a) is as defined in Notes to Table One.
(b) Water Wash is the combined aqueous phase resulting from contacting the Ext.Org. with water. Washed Org. is the organic phase resulting from contacting the Ext.Org. with water. Ammonia is the combined ammonia solutions resulting from contacting the Washed Org. with the ammonia solution. Res.Org. is the residual organic phase resulting from contacting the Washed Org. with the ammonia solution.

EXAMPLE 4

The procedures described in Example 3 were repeated with the exception that the aqueous solution was a further sample of the solution used in Example 2. The results obtained are set out in Table Four.

TABLE Four

| Phase (a)(b) | Metal and Concentration (mg/dm³) | |
|---|---|---|
| | Cu | Pd |
| Orig.Aq. | 73500 | 28000 |
| Ext.Org. | 9366 | 8655 |
| Water Wash | 4702 | <1 |
| Washed Org. | 0.4 | 8758 |
| Ammonia | ND | 4520 |
| Res.Org. | ND | 30 |

Notes to Table Four
(a) is as defined in Notes to Table One.
(b) is as defined in Notes to Table Three.

It will be observed from Examples 3 and 4 that selective stripping to obtain copper and palladium essentially free from the other metal is possible.

EXAMPLES 5 to 10

The procedures described in Example 3 were repeated with the exceptions that the extraction stage was effected using 3 volumes of the organic solution to 1 volume of the aqueous solution containing platinum group metals, as used in Example 1, different substituted heterocyclic compounds were used as the extractant and an ammonia solution containing 25% v/v of 880 ammonia was used. The concentration of the extractant in the organic solution was 0.5 M in all cases.

The results of the analyses of the various fractions at different stages are set out in Table Five and Table Six.

TABLE FIVE

| Phase (c) | Example 5 PyE (d) | | | Example 6 PyE* (d)(e) | | | Example 7 PzE (f) | | |
|---|---|---|---|---|---|---|---|---|---|
| | Cu | Pt | Pd | Cu | Pt | Pd | Cu | Pt | Pd |
| EA | 2250 | 70 | 30 | 4035 | 45 | 15 | 6030 | 65 | 20 |
| EO | 1875 | <10 | 2320 | 1480 | <10 | 2600 | 645 | <10 | 2465 |
| WW | 765 | <5 | <5 | 660 | <5 | <5 | 310 | 5 | <5 |
| WO | <10 | <10 | 2380 | <10 | <10 | 2590 | <10 | <10 | 2565 |
| AM | <5 | <5 | 1170 | <5 | <5 | 1200 | <5 | <5 | 1220 |
| RO | <10 | <10 | 15 | <10 | <10 | 25 | <10 | <10 | <10 |

TABLE SIX

| Phase (c) | Example 8 PrE (h) | | | Example 9 TzE* (e)(i) | | | Example 10 BzE (j) | | |
|---|---|---|---|---|---|---|---|---|---|
| | Cu | Pt | Pd | Cu | Pt | Pd | Cu | Pt | Pd |
| EA | 6535 | 70 | 70 | 470 | 70 | 15 | 1090 | 75 | 745 |
| EO | 435 | <10 | 2480 | 2410 | <10 | 2570 | 2345 | <10 | 2205 |
| WW | 170 | <5 | <5 | 1000 | <5 | <5 | 1080 | <10 | <5 |
| WO | 45 | <10 | 2315 | 150 | <10 | 2625 | <10 | <5 | 1910 |
| AM | 15 | <5 | 1115 | 80 | <5 | 1810 | <5 | <5 | 1020 |
| RO | <10 | <10 | 50 | | | | <10 | <10 | 10 |

Notes to Table Five and Table Six
(c) EA is Ext.Aq. as defined in Note (a) to Table One.
EO is Ext.Org. as defined in Note (a) to Table One.
WW is Water Wash as defined in Note (b) to Table Two.
WO is Washed Org. as defined in Note (b) to Table Two.
AM is Ammonia as defined in Note (b) to Table Two.
RO is Res.Org. as defined in Note (b) to Table Two.
(d) PyE is the pyridine ester used in Example 1.
(e) *The organic solution was a solution of the extractant in AROMASOL H.
(f) PzE is the mixed branched octadecyl ester of pyrazine-2-carboxylic acid.
(h) PrE is the mixed branched octadecyl ester of 4-phenylpyrimidine-5-carboxylic acid.
(i) TzE is 1-(2'-octyldodecyloxycarbonyl)-1,2,4-triazole.
(j) BzE is mixed branched 1-octadecyloxycarbonylbenzimidazole.

We claim:

1. A solvent extraction process by extracting palladium values from aqueous solutions of palladium salts containing halide or pseudo halide anion and at least one additional metal which comprises the step of (1) contacting the aqueous solution containing palladium salts with a solution of an extractant in a water-immiscible organic solvent for as little as thirty minutes; (2) separating the aqueous solution from the solution of the extractant in the water-immiscible solvent into which palladium has been extracted; and (3) contacting the resultant organic phase with an aqueous strip solution sufficient that the palladium transfers into the aqueous strip solution wherein in step (1) the aqueous solution of palladium salts containing halide or pseudo halide anion is contacted with a solution in a water-immiscible organic solvent of an extractant which is a substituted heterocyclic compound containing a single heterocyclic ring containing 1, 2 or 3 nitrogen ring atoms and one or more groups —COX which are linked directly to the heterocyclic ring or an linked to the heterocyclic ring through a group A wherein A is an optionally substituted methylene linking group, an optionally substituted vinylene linking group or an optionally substituted phenylene linking group;

X is a group $-OR^1$ or $-NR^2R^3$;

$R^1$ is a hydrocarbyl group or substituted hydrocarbyl group containing from 5 to 36 carbon atoms; and $R^2$ and $R^3$ which may be the same or different, are hydrogen or a hydrocarbyl group or a substituted hydrocarbyl group, and in each group $-NR^2R^3$, $R^2$ and $R^3$ together contain from 5 to 36 carbon atoms.

2. The process of claim 1 wherein the aqueous solution of palladium salts is either one which has been obtained from a palladium-containing catalyst and contains other metals also present in the catalyst or as contaminants, or is a solution containing platinum group metals.

3. The process of claim 2 wherein the aqueous solution of palladium salts contains at least platinum and palladium.

4. The process of claim 1 wherein the substituted heterocyclic compound is of the general formula:

Het [(A)$_a$(COX)$_y$]n where A and X are as hereinbefore defined;
Het is, or contains, a single heterocyclic ring containing 1, 2 or 3 nitrogen ring atoms and the group or groups —(A)$_a$(COX)$_y$ are linked to the ring atoms of the heterocyclic ring;
a is 0 or 1;
n is at least one up to the maximum number of free valencies in the heterocyclic ring; and
y is from 1 up to 3.

5. The process of claim 4 wherein the substituted heterocyclic compound is one in which the free valencies which are not occupied by a group —(A)$_a$(COX)$_y$ are occupied either by a hydrogen atom or a substituent group Y, wherein
Y is selected from halogen, alkyl, aryl, alkoxy, aryloxy, aralkyl, alkaryl, cyano, nitro or carboxylic acid.

6. The process of claim 1 wherein the group X is a group —OR$^1$ and R$^1$ is an alkyl group containing from 8 to 24 carbon atoms.

7. The process of claim 1 wherein the extractant is a substituted pyridine of formula:

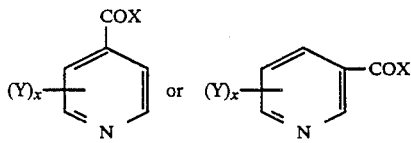

where X and Y are as defined; and
x is zero or an integer from 1 to 4.

8. The process of claim 1 wherein the extractant is a substituted pyridine of the formula:

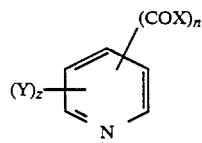

wherein
X is a group —OR$^1$ or —NR$^2$R$^3$;
n is 2 or 3;
each R$^1$ which may be the same or different, is an alkyl group and together the groups R$^1$ contain a total of from 16 to 36 carbon atoms;
each R$^2$ and R$^3$ which may be the same or different, is an alkyl group and the total number of alkyl carbon atoms contained in all the respective groups R$^2$ and R$^3$ is from 20 to 70;
z is zero or an integer from 1 up to (5-n); and
each Y which may be the same or different, is one or more of the substituents halogen, alkyl, aryl, alkoxy, aryloxy, aralkyl, cyano, nitro or carboxylic acid.

9. The process of claim 1 wherein the extractant is a substituted pyrimidine, pyrazine or pyridazine of the formula:

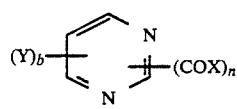

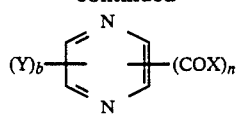

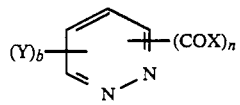

wherein X and Y are both as defined;
n is 1, 2 or 3; and
b is zero or an integer from 1 up to (4-n).

10. The process of claim 9 wherein n is two and the extractants are alkyl esters of 4,5-dicarboxypyrimidine, 2,6-dicarboxypyrazine or 4,5-dicarboxypyridazine.

11. The process of claim 1 wherein the extractant is a substituted triazole of the formula:

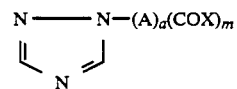

where A, X and a are all as defined; and
m is from 1 to 3.

12. The process of claim 11 wherein the extractant is of the formula:

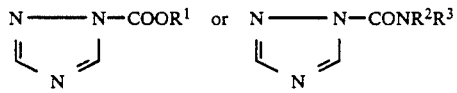

where R$^1$, R$^2$ and R$^3$ are all as defined.

13. The process of claim 1 wherein the extractant is a N-substituted 1,3-diazole of the formula:

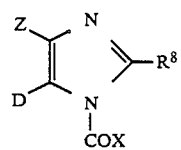

wherein X is as defined;
R$^8$ is hydrogen or an optionally substituted lower alkyl group or an optionally substituted vinyl group; and
D and Z, which may be the same or different, are separately hydrogen, an optionally substituted hydrocarbon group, a halogen, a nitro group, a cyano group or a carboxylic ester group, or where D and Z both together with the two carbon atoms joining them form an optionally substituted aromatic or aliphatic cyclic group.

14. The process of claim 13 wherein the extractant is a benzimidazole of the formula:

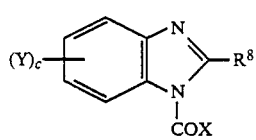

where R$^8$, X and Y are all as defined; and c is zero or from 1 up to 3.

15. The process of claim 1 wherein the aqueous solution containing palladium salts also contains a copper salt and, in step (1) copper is also extracted into the solution of the extractant, wherein step (3) is effected in two stages and in the first stage (a) the organic phase is contacted with water or an aqueous acid to give an organic phase containing palladium and essentially free of copper and in the second stage (b) the residual organic phase is contacted with an aqueous ammonia solution.

16. The process of claim 15 wherein palladium is stripped from the residual organic phase in step (3b) and is recovered from the aqueous ammonia solution.

17. The process of claim 1 wherein the extractant is a bis-ester of pyridine-3,5-dicarboxylic acid; an ester of pyrazine-2-carboxylic acid; an ester of 4-phenylpyrimidine-5-carboxylic acid; an ester of 1,2,4-triazole-1-carboxylic acid or an ester of benzimidazole-1-carboxylic acid.

* * * * *